(12) United States Patent
Tateishi et al.

(10) Patent No.: US 9,192,212 B2
(45) Date of Patent: Nov. 24, 2015

(54) LAMINATE FOR LASER BONDING, SHOE, AND METHOD FOR PRODUCING SHOE

(75) Inventors: Junichiro Tateishi, Kobe (JP); Katsuhiro Imazato, Kobe (JP); Sadaki Mori, Kobe (JP); Kenichi Harano, Kobe (JP); Hironori Kitayama, Kobe (JP)

(73) Assignee: ASICS CORPORATION, Kobe-Shi (JP)

( * ) Notice: Subject to any disclaimer, the term of this patent is extended or adjusted under 35 U.S.C. 154(b) by 579 days.

(21) Appl. No.: 13/502,123

(22) PCT Filed: Oct. 15, 2009

(86) PCT No.: PCT/JP2009/067832
§ 371 (c)(1),
(2), (4) Date: Apr. 13, 2012

(87) PCT Pub. No.: WO2011/045856
PCT Pub. Date: Apr. 21, 2011

(65) Prior Publication Data
US 2012/0204446 A1    Aug. 16, 2012

(51) Int. Cl.
*B32B 3/26* (2006.01)
*B32B 7/12* (2006.01)
(Continued)

(52) U.S. Cl.
CPC .............. *A43D 25/06* (2013.01); *A43B 13/04* (2013.01); *A43B 13/12* (2013.01); *A43D 86/00* (2013.01); *B23B 27/08* (2013.01); *B29C 65/168* (2013.01); *B29C 65/1635* (2013.01);
(Continued)

(58) Field of Classification Search
CPC .... B29C 65/1635; B29C 65/168; B32B 7/12; B32B 27/08
USPC ................................... 428/304.4, 343
See application file for complete search history.

(56) References Cited

U.S. PATENT DOCUMENTS 3,247,536 A * 4/1966 Rossitto et al. .............. 12/142 F
4,703,533 A * 11/1987 Barma ......................... 12/142 E
(Continued)

FOREIGN PATENT DOCUMENTS

EP          1762368 A1    3/2007
JP          03-229779 A   10/1991
(Continued)

OTHER PUBLICATIONS

Abstract of JP 2000-041702.*
(Continued)

*Primary Examiner* — Victor Chang
(74) *Attorney, Agent, or Firm* — Mintz Levin Cohn Ferris Glovsky and Popeo, P.C.

(57) ABSTRACT

A laminate for laser bonding of the present invention contains a bonding sheet that is melted by irradiation of laser light and a first member laminated on one surface of the bonding sheet and formed of a thermoplastic foam. The difference between the melting point of the first member (Mfoam) and the melting point of the bonding sheet (Msheet) (Mfoam−Msheet) is −50° C. to 20° C. and the difference between the melt viscosity of the first member (Vfoam) and the melt viscosity of the bonding sheet (Vsheet) (Vfoam−Vsheet) is $3.0 \times 10^5$ Pa·s to $8.0 \times 10^5$ Pa·s. Preferably, the laminate for laser bonding contains a second member having transparency to laser light laminated on the other surface of the bonding sheet.

12 Claims, 2 Drawing Sheets

(51) Int. Cl.
    *A43D 25/06* (2006.01)
    *A43B 13/04* (2006.01)
    *A43B 13/12* (2006.01)
    *A43D 86/00* (2006.01)
    *B29C 65/50* (2006.01)
    *B23B 27/08* (2006.01)
    *B29C 65/48* (2006.01)
    *B29C 65/16* (2006.01)
    *B29C 65/00* (2006.01)
    *B29L 31/50* (2006.01)

(52) U.S. Cl.
    CPC ........ *B29C 65/4815* (2013.01); *B29C 65/5057* (2013.01); *B29C 66/45* (2013.01); *B29C 66/727* (2013.01); *B29C 66/7392* (2013.01); *B29C 66/73116* (2013.01); *B29C 66/73122* (2013.01); *B32B 7/12* (2013.01); *B29C 65/1616* (2013.01); *B29C 65/1664* (2013.01); *B29C 65/1674* (2013.01); *B29C 66/30326* (2013.01); *B29C 66/71* (2013.01); *B29C 66/919* (2013.01); *B29C 66/9161* (2013.01); *B29C 66/934* (2013.01); *B29C 66/939* (2013.01); *B29L 2031/50* (2013.01); *Y10T 428/24942* (2015.01)

(56) References Cited

U.S. PATENT DOCUMENTS 4,730,402 A * 3/1988 Norton et al. ................ 36/30 R
2004/0056006 A1 3/2004 Jones et al.
2006/0101671 A1 5/2006 Berend et al.
2007/0266593 A1 11/2007 Schindler et al.
2010/0251572 A1 * 10/2010 Baudouin et al. ............... 36/103
2010/0251577 A1 * 10/2010 Yamada ...................... 36/25 R

FOREIGN PATENT DOCUMENTS

| JP | 08-150676 A | | 6/1996 |
| JP | 11-300866 A | | 11/1999 |
| JP | 2000041702 A | * | 2/2000 |
| JP | 2002086603 A | | 3/2002 |
| JP | 2003-231870 A | | 8/2003 |
| JP | 2004338325 A | | 12/2004 |
| JP | 2005280229 A | | 10/2005 |
| JP | 2008-007584 A | | 1/2008 |
| JP | 2008145497 A | | 6/2008 |
| JP | 2009-155402 A | | 7/2009 |
| JP | 2009173023 A | | 8/2009 |
| JP | 2009-269401 A | | 11/2009 |

OTHER PUBLICATIONS

Supplementary European Search Report for Application No. EP 09850398.0-1706/2489497 PCT/JP2009067832. Date of completion of search Jun. 6, 2013. EPO issued Jun. 14, 2013.

Japanese Office Action dated Mar. 16, 2012, corresponding to Japanese Patent Application No. JP2011-643905 and partial English translation.

* cited by examiner

LAMINATE FOR LASER BONDING, SHOE, AND METHOD FOR PRODUCING SHOE

CROSS-REFERENCE TO RELATED APPLICATIONS

This application is a U.S. national phase application under 37 U.S.C. §371 of Patent Cooperation Treaty Application No. PCT/JP2009/067832 filed on Oct. 15, 2009. The disclosure of each application listed in this paragraph is incorporated by reference herein in its entirety.

TECHNICAL FIELD

The present invention relates to a laminate for laser bonding which is bonded by irradiation of laser light, and uses of the same.

A shoe is produced by bonding an each component such as a midsole and the like.

Traditionally, bonding of the aforementioned each component has been performed by using a solvent adhesive or a hot-melt adhesive.

However, a bonding method using the solvent adhesive requires a step of coating the adhesive and a step of volatilizing a solvent, and therefore takes long time. Further, components of a shoe may have a complicatedly shaped bonding surface. Such a complicatedly shaped bonding surface cannot be coated with the solvent adhesive by using a machine, and reliance must be placed upon hand work to coat the adhesive. Therefore, uneven bonding between elements likely occurs due to human errors.

A bonding method using the hot-melt adhesive does not cause volatilization of a solvent, and is therefore preferable from an environmental viewpoint. However, the hot-melt adhesive generally has a high viscosity and is therefore hard to be coated. Particularly, it is difficult to uniformly coat the complicatedly shaped bonding surface with the hot-melt adhesive.

On the other hand, bonding methods using laser light are known. A laser bonding method does not have disadvantages associated with the bonding methods using the solvent adhesive and the hot-melt adhesive. Thus, it is considered that a bonding method using laser light is used in production of a shoe.

For example, Patent Document 1 (Japanese Unexamined Patent Application No. 2008-7584) discloses the following laser bonding method.

A first member composed of a material having transparency to laser light, a second member composed of a material different from the first member, and a bonding sheet that is composed of an elastomer having a storage elastic modulus of 0.05 MPa at 20° C. and has a thickness of 20 to 1000 μm are laminated, with the bonding sheet placed between the first member and the second member. The bonding sheet is melted by irradiation of laser light from the first member side of this laminate to bond the first member and the second member together.

Patent Document 1 indicates that according to such a laser bonding method, stresses generated between different materials can be reduced, and therefore different materials can be bonded with increased bonding strength.

Components of the shoe (such as a midsole) may be formed of a foam (so called sponge material). The foam has an infinite number of air bubbles and is therefore hard to be bonded to the bonding sheet. Thus, there is a problem that delamination easily occurs at the interface between the foam and the bonding sheet after the laser bonding.

Patent Document 1 does not disclose or suggest any bonding method suitable for bonding of a foam.

Patent Document 1: Japanese Unexamined Patent Publication No. 2008-7584

SUMMARY OF INVENTION

The first object of the present invention is to provide a laminate for laser bonding and a shoe in which a bonding sheet and a foam can be bonded together in good condition by irradiation of laser light.

The second object of the present invention is to provide a method of producing a shoe in which a first member formed of a foam and a second member can be bonded together in good condition with a bonding sheet interposed therebetween by irradiation of laser light.

The present inventors have conducted vigorous studies on a factor which makes it difficult to bond a bonding sheet and a foam together in good condition by irradiation of laser light.

The foam has an infinite number of air bubbles. Thus, the foam is easily deformed by heat (typically deformation by heat shrinkage). Particularly, when the air bubbles are present on the surface of the foam (in this case, the foam has an uneven surface due to air bubbles), the foam is easily deformed on the surface. On the other hand, the bonding sheet is deformed by heat to a lesser extent as compared to the foam. In other words, the foam and the bonding sheet are largely different in melt-solidification behaviors due to a structural difference (the foam has a porous structure and the sheet has a solid structure). Accordingly, it is presumed that good bonding is not provided at the interface between the bonding sheet and the foam.

Under such presumption, the present inventors have further conducted vigorous studies to complete the present invention.

The first laminate for laser bonding of the present invention contains a bonding sheet that is melted by irradiation of laser light and a first member laminated on one surface of the bonding sheet and formed of a thermoplastic foam. The difference between the melting point of the first member (Mfoam) and the melting point of the bonding sheet (Msheet) (Mfoam−Msheet) is −50° C. to 20° C., and the difference between the melt viscosity of the first member (Vfoam) and the melt viscosity of the bonding sheet (Vsheet) (Vfoam−Vsheet) is $3.0 \times 10^5$ Pa·s to $8.0 \times 10^5$ Pa·s.

Here, the melt viscosity described above is a viscosity obtained by heating an object to 200° C. to be melted.

In the laminate for laser bonding, the bonding sheet generates heat by irradiation of laser light, and the first member is melted as the bonding sheet is melted. Thus, the bonding sheet and the first member formed of a foam are bonded together in good condition, and are therefore hard to be delaminated at the interface between the bonding sheet and the first member.

The present inventors attribute to the following factor, the fact the bonding sheet and the first member are bonded together in good condition by irradiating the laminate for laser bonding with laser light.

As described above, the difference between the melting point of the first member (Mfoam) and the melting point of the bonding sheet (Msheet) (Mfoam−Msheet) is −50° C. to 20° C., and therefore the difference between the melt-solidification rate of the first member and the melt-solidification rate of the bonding sheet is small. Accordingly, the melted bonding sheet easily spreads over a large area of the surface of the first member. In other words, the melted bonding sheet easily diffuses over the surface of the first member.

The difference between the melt viscosity of the first member (Vfoam) and the melt viscosity of the bonding sheet (Vsheet) (Vfoam−Vsheet) is $3.0 \times 10^5$ Pa·s to $8.0 \times 10^5$ Pa·s. Accordingly, the melted bonding sheet easily spreads over a large area of the surface of the first member and further, the melted bonding sheet easily enters recesses of the uneven surface (uneven surface due to air bubbles) of the first member formed of a foam. When the melted bonding sheet thus enters recesses of the uneven surface of the first member, an anchor effect is created. By the anchor effect, the interfaces of the bonding sheet and the first member are strongly bonded together.

The second laminate for laser bonding of the present invention contains a bonding sheet that is melted by irradiation of laser light and a first member laminated on one surface of the bonding sheet and formed of a thermoplastic foam. The difference between the melting point of the first member (Mfoam) and the melting point of the bonding sheet (Msheet) (Mfoam−Msheet) is −50° C. to 20° C., the difference between the melt viscosity of the first member (Vfoam) and the melt viscosity of the bonding sheet (Vsheet) (Vfoam−Vsheet) is $8.0 \times 10^5$ Pa·s to $5.0 \times 10^6$ Pa·s, and the melt viscosity of the bonding sheet is 30 Pa·s to 2000 Pa·s.

In the second laminate for laser bonding, the bonding sheet and the first member formed of a foam are bonded together in good condition by irradiation of laser light. Thus, the bonding sheet and the first member are hard to be delaminated at the interface thereof.

The present inventors attribute to the following factor, the fact the bonding sheet and the first member are bonded together in good condition.

The difference between the melt viscosity of the first member (Vfoam) and the melt viscosity of the bonding sheet (Vsheet) (Vfoam−Vsheet) is $8.0 \times 10^5$ Pa·s to $5.0 \times 10^6$ Pa·s, and the melt viscosity of the bonding sheet is 30 Pa·s to 2000 Pa·s. Even though the difference in melt viscosity is relatively large as described above, the melted bonding sheet easily enters recesses of the first member if the melt viscosity of the bonding sheet itself is small. The anchor effect is created when the melted bonding sheet enters recesses of the first member having the uneven surface. The interfaces of the bonding sheet and the first member are strongly bonded together by the anchor effect.

In a preferable laminate for laser bonding of the present invention, the bonding sheet includes an olefin-based resin or an olefin-based elastomer, and the foam includes an olefin-based resin or an olefin-based elastomer.

In a preferable laminate for laser bonding of the present invention, a second member having transparency to laser light is laminated on the other surface of the bonding sheet.

In another aspect of the present invention, a shoe is provided.

The shoe has any one of the laminate for laser bonding described above.

In another aspect of the present invention, a method for producing a shoe is provided.

The first method for producing a shoe of the present invention contains the steps of preparing a laminate in which a first member formed of a thermoplastic foam, a bonding sheet that is melted by irradiation of laser light, and a second member having transparency to laser light are laminated in this order, with the difference between the melting point of the first member (Mfoam) and the melting point of the bonding sheet (Msheet) (Mfoam−Msheet) being −50° C. to 20° C. and the difference between the melt viscosity of the first member (Vfoam) and the melt viscosity of the bonding sheet (Vsheet) (Vfoam−Vsheet) being $3.0 \times 10^5$ Pa·s to $8.0 \times 10^5$ Pa·s; and bonding the first member and the second member together with the bonding sheet interposed therebetween by irradiation of laser light from above the second member of the laminate.

The second method for producing a shoe of the present invention contains the steps of preparing a laminate in which a first member formed of a thermoplastic foam, a bonding sheet that is melted by irradiation of laser light, and a second member having transparency to laser light are laminated in this order, with the difference between the melting point of the first member (Mfoam) and the melting point of the bonding sheet (Msheet) (Mfoam−Msheet) being −50° C. to 20° C. and the difference between the melt viscosity of the first member (Vfoam) and the melt viscosity of the bonding sheet (Vsheet) (Vfoam−Vsheet) being $8.0 \times 10^5$ Pa·s to $5.0 \times 10^6$ Pa·s, and the melt viscosity of the bonding sheet (Vsheet) is 30 Pa·s to 2000 Pa·s; and bonding the first member and the second together with the bonding sheet interposed therebetween by irradiation of laser light from above the second member of the laminate.

The first member and the second member each correspond to each component of a shoe. For example, the first member is a midsole, an innersole, a lightweight outersole, or the like, and the second member is an outersole, a trusstic (shank), or the like.

In the laminate for laser bonding of the present invention, the bonding sheet and the first member formed of a foam are strongly bonded together by irradiating laser light.

Thus, the laminate for laser bonding of the present invention may be used as a component of a product which is used under a severe environment, for example a component of a shoe.

DESCRIPTION OF EMBODIMENTS (Examples of Laminate Structure of Laminate for Laser Bonding)

The laminate for laser bonding of the present invention contains a bonding sheet that is melted by irradiation of laser light, a first member laminated on one surface of the bonding sheet, and a second member laminated on the other surface of the bonding sheet. The first member is formed of a thermoplastic foam.

Figure 1:
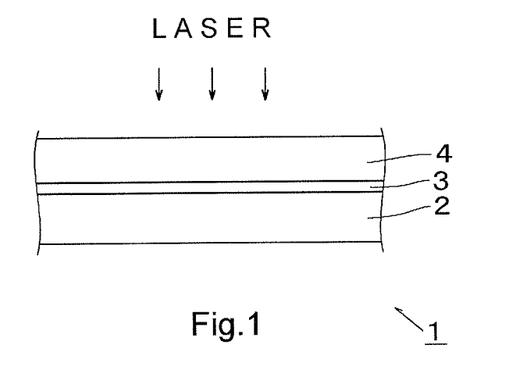
FIG. 1 is a side view of one embodiment of a laminate for laser bonding.

FIG. 1 shows one embodiment of a laminate for laser bonding.

The laminate for laser bonding 1 in FIG. 1 has a first member 2 formed of a thermoplastic foam, a bonding sheet 3 placed on the upper surface of the first member 2, and a second member 4 placed on the bonding sheet 3, which are laminated in this order.

(First Member)

The first member is composed of a foam (foamed member). The first member formed of a foam has air bubbles. The surface of the first member is an uneven surface based on the air bubbles. In other words, on the surface of the first member, there exist an infinite number of small recesses in relation to air bubbles. A skin layer may be formed on the surface of the first member in order that the surface of the first member is made flat (projections and recesses of the surface of the first member are eliminated).

The foam is obtained by foaming a polymer material. The polymer material is not particularly limited as long as it is a material having thermoplasticity (material that can be melted by heat). Examples of the polymer material of the foam include, for example, thermoplastic resins, thermoplastic elastomers, rubbers, and the like. For the polymer material of the foam, one selected from those described above may be used alone or in combination of two or more kinds.

Examples of the thermoplastic resin include, for example, olefin-based resins such as low density polyethylene, high density polyethylene, polypropylene, ethylene-vinyl acetate copolymers (EVA), and ethylene-α olefin copolymers; ester-based resins such as polyethylene terephthalate and polybutylene terephthalate; styrene-based resins such as polystyrene, AS resins and ABS resins; amide-based resins such as 6-nylon; vinyl chloride-based resins; acryl-based resins such as polymethylmethacrylate; vinyl acetate-based resins; and the like. These may be used alone or in combination of two or more kinds.

Examples of the thermoplastic elastomer include, for example, olefin-based elastomers, styrene-based elastomers, urethane-based elastomers, ester-based elastomers, fluorine-based elastomers, silicone-based elastomers, polyamide-based elastomers, and the like. These may be used alone or in combination of two or more kinds.

Examples of the rubber include synthetic rubbers such as butadiene rubber (BR), isoprene rubber (IR), chloroprene (CR); natural rubbers (NR); copolymer rubbers such as styrene-butadiene rubber (SBR), styrene-butadiene-styrene rubber (SBSR), acrylonitrile-butadiene rubber (NBR), styrene-isoprene copolymer (SIR), butyl rubber (IIR); and the like. These may be used alone or in combination of two or more kinds.

The content of the polymer material in the foam is not particularly limited, but a satisfactory foam cannot be obtained if the content of the polymer material is too low. The blended amount of the polymer material is normally 50% by mass or more and preferably 80% by mass or more based on the total amount of the foam. The upper limit of the blended amount of the polymer material is theoretically 100% by mass. In practice, however, a forming agent and/or an additive are(is) often blended in the foam, and therefore the blended amount of the polymer material is normally 99.9% by mass or less.

The polymer material of the foam is preferably an olefin-based resin or an olefin-based elastomer because a strong, lightweight, and flexible foam can be formed. Particularly, the polymer material of the foam is more preferably an olefin-based resin because a lightweight foam can be formed. Specifically, the foam is formed of at least one selected from the group consisting of a low density polyethylene having a specific gravity of 0.90 to 0.93 and a MFR of 0.1 to 100 g/10 minutes, an ethylene-vinyl acetate copolymer having a MFR of 0.1 to 100 g/10 minutes, and an ethylene-αolefin copolymer having a MFR of 0.1 to 100 g/10 minutes. A foam including at least one selected from the materials described above has an excellent mechanical strength and elasticity, and is bonded to a bonding sheet in good condition.

The content of the vinyl acetate in the ethylene-vinyl acetate copolymer is preferably 3% to 30%, and more preferably 5% to 25%. The αolefin in the ethylene-αolefin copolymer preferably has a carbon number of 3 to 20.

Herein, in the present specification, "MFR (melt flow rate)" refers to a value measured at a temperature of 190° C. under a load of 2.16 kgf in accordance with a method defined in JIS K 7210 A code.

The polymer material of the foam (such as the thermoplastic resin described above) may be or may not be crosslinked. If the foam (first member) is a component of a shoe, the polymer material of the foam is preferably crosslinked. The crosslinked foam has an excellent mechanical strength. The component of a shoe is required to have durability. Therefore, as a component of a shoe, a crosslinked foam is preferably used.

When the polymer material of the foam is crosslinked, the crosslinking method is not particularly limited, and examples thereof include electron radiation crosslinking, chemical crosslinking, and the like. Examples of electron radiation include an X ray, an α-ray, a β-ray, a γ-ray, and the like. In the case of chemical crosslinking, a crosslinker such as a peroxide is blended in the polymer material.

The density of the foam (apparent density) is not particularly limited. If the density is too low or too high, however, a foam having a satisfactory elasticity cannot be obtained. Therefore, the density (apparent density) of the foam is preferably 0.05 g/cm$^3$ to 0.8 g/cm$^3$. Particularly, if the foam is a component of a shoe, the density of the foam (apparent density) is preferably 0.08 g/cm$^3$ to 0.4 g/cm$^3$.

The thickness of the foam is not particularly limited, and may be set to an appropriate thickness according to the intended use. If the thickness of the foam is too small, however, the foam (first member) may be perforated by heat during irradiation of laser light. Therefore, the foam preferably has a thickness of 3 mm or more. There is no upper limit for the thickness of the foam. However, when the foam is used as a component of a shoe, the thickness of the foam is normally 50 mm or less.

The feature of the present invention is that the difference between the melting point of the first member (Mfoam) and the melting point of the bonding sheet (Msheet) (Mfoam−Msheet) is set in the range of −50° C. to 20° C.

Particularly, the difference in melting point (Mfoam−Msheet) is preferably −40° C. to 20° C., and more preferably −40° C. to 10° C.

Hereinafter, "Mfoam" denotes the melting point of the first member, "Msheet" denotes the melting point of the bonding sheet, and "Mfoam−Msheet" denotes a difference in melting point obtained by subtracting the melting point of the bonding sheet from the melting point of the first member.

If the difference in melting point (Mfoam−Msheet) is less than −50° C., the melting point of the first member relatively decreases. Therefore, the first member is considerably deformed by heat during irradiation of laser light and consequently, the bonding sheet does not closely contact the surface of the first member in good condition.

On the other hand, if the difference in melting point (Mfoam−Msheet) is more than 20° C., the difference in melt-solidification rate between the first member and the bonding sheet increases, and therefore the melted bonding sheet is hard to diffuse over the surface of the first member. The melt-solidification rate refers to a time taken for a melted material to solidify again.

The melting point can be measured using a differential calorimeter. The specific measurement method is as described in "method for measurement of melting point" in Examples below.

The melting point of the first member (Mfoam) is not particularly limited as long as the difference in melting point (Mfoam−Msheet) meets the above requirement. However, the heat resistance is poor if the melting point (Mfoam) is too low, while the first member may not be sufficiently melted during laser bonding if the melting point (Mfoam) is too high.

From this point of view, the melting point of the first member (Mfoam) is preferably 70° C. to 120° C., more preferably 80° C. to 110° C., and particularly preferably 95° C. to 110° C.

The feature of the present invention is that the difference between the melt viscosity of the first member (Vfoam) and the melt viscosity of the binding sheet (Vsheet) (Vfoam−Vsheet) is set in the range of $3.0 \times 10^5$ Pa·s to $8.0 \times 10^5$ Pa·s.

Particularly, the difference in melt viscosity (Vfoam−Vsheet) is preferably $3.5 \times 10^5$ Pa·s to $7.5 \times 10^5$ Pa·s.

Here, the melt viscosity refers to a viscosity of an object (first member, bonding sheet, and the like) in a melted state. In the present invention, the melt viscosity corresponds to a viscosity when the object is heated and melted at 200° C.

Hereinafter, "Vfoam" denotes the melt viscosity of the first member, "Vsheet" denotes the melt viscosity of the bonding sheet, and "Vfoam−Vsheet" denotes a difference in melt viscosity obtained by subtracting the melt viscosity of the bonding sheet from the melt viscosity of the first member.

If the difference in melt viscosity (Vfoam−Vsheet) is less than $3.0 \times 10^5$ Pa·s, the melted bonding sheet is hard to enter recesses of the uneven surface of the first member. Therefore, sufficient anchor effect is not created between the bonding sheet and the first member and consequently, delamination easily occurs at the interface between the bonding sheet and the first member. On the other hand, if the difference in melt viscosity (Vfoam−Vsheet) is more than $8.0 \times 10^5$ Pa·s, the melted bonding sheet hardly spreads over the surface of the first member.

However, even though the difference in melt viscosity (Vfoam−Vsheet) is $8.0 \times 10^5$ Pa·s to $5.0 \times 10^6$ Pa·s, the bonding sheet and the first member can be bonded together in good condition if the melt viscosity of the bonding sheet (Vsheet) is 30 Pa·s to 2000 Pa·s. Particularly, even though the difference in melt viscosity is more than $8.0 \times 10^5$ Pa·s and $5.0 \times 10^6$ Pa·s or less (preferably, the difference in melt viscosity is more than $8.0 \times 10^5$ Pa·s and $3.0 \times 10^6$ Pa·s or less), the bonding sheet and the first member can be bonded together in good condition if the melt viscosity of the bonding sheet (Vsheet) is 30 Pa·s to 2000 Pa·s. This is because a bonding sheet having a low melt viscosity easily enters recesses of the first member when melted by laser irradiation. Accordingly, the bonding sheet and the first member are strongly bonded together by the anchor effect.

The melt viscosity can be measured using a rheometer. The specific measurement method is as described in "method for measurement of melt viscosity" in Examples below.

The melt viscosity of the first member (Vfoam) is not particularly limited. However, the first member is easily deformed during laser bonding if the melt viscosity of the first member (Vfoam) is too low, while interfacial diffusion with the bonding sheet hardly occurs if the melt viscosity (Vfoam) is too high.

From this point of view, the melt viscosity of the first member (Vfoam) is preferably $2.0 \times 10^5$ Pa·s to $3.0 \times 10^6$ Pa·s, and more preferably $2.9 \times 10^5$ Pa·s to $2.6 \times 10^6$ Pa·s. Particularly, if the difference in melt viscosity (Vfoam−Vsheet) is in the range of $3.0 \times 10^5$ Pa·s and $8.0 \times 10^5$ Pa·s, the melt viscosity of the first member (Vfoam) is preferably $2.0 \times 10^5$ Pa·s to $3.0 \times 10^6$ Pa·s, and more preferably $2.9 \times 10^5$ Pa·s to $2.6 \times 10^6$ Pa·s.

The foam (first member) is obtained by foaming a composition containing the polymer material described above. Examples of the foaming process include conventional known processes such as chemical foaming, physical foaming, and mechanical foaming processes. An appropriate foaming agent is blended in the composition as required in accordance with these foaming processes.

If the foam (first member) is used as, for example, a midsole of a shoe, the foam is formed in accordance with the shape of the midsole.

An additive may be blended in the foam as necessary. Examples of the additive include viscosity modifiers (such as thickeners), plasticizers, softeners, weathering agents, antioxidants, ultraviolet absorbers, lubricants, antistatic agents, dispersants, and the like. If the additive is blended, the blended amount thereof is preferably 1% by mass to 20% by mass based on the total amount of the foam.

A foam having the abovementioned melting point (Mfoam) and melt viscosity (Vfoam) can be obtained by a known adjustment method. Examples of the adjustment method include selecting a polymer material and an additive as appropriate or crosslinking the polymer material.

(Bonding Sheet)

The bonding sheet is not particularly limited as long as it is a sheet that can be melted by irradiation of laser light. The bonding sheet is preferably a thin film which is not foamed (namely, a non-foamed thin film which contains substantially no air bubbles).

The bonding sheet is obtained by molding a polymer material into a sheet form. Examples of the polymer material include thermoplastic resins, thermoplastic elastomers, rubbers, and the like. For specific examples thereof, see the passage of the first member described above as they are as described therein.

The content of the polymer material in the bonding sheet is not particularly limited, but if the content of the polymer material is too low, a sheet having an excellent bondability cannot be obtained. Accordingly, the blended amount of the polymer material is normally 80% by mass or more and preferably 95% by mass or more based on the total amount of the bonding sheet.

On the other hand, the upper limit of the blended amount of the polymer material is theoretically 100% by mass. In practice, however, an additive is often blended in the binding sheet, and therefore the blended amount of the polymer material is normally 99.9% by mass or less.

The bonding sheet preferably has an excellent flexibility even after the first member and the second member are bonded together. The polymer material of the bonding sheet is preferably an olefin-based resin or an olefin-based elastomer, and particularly preferably an olefin-based resin, because such a bonding sheet can be formed. Specifically, the binding sheet is formed of at least one selected from the group consisting of a low density polyethylene having a specific gravity of 0.90 to 0.93 and a MFR of 0.1 to 200 g/10 minutes, a high density polyethylene having a specific gravity of 0.94 or more and a MFR of 1 to 100 g/10 minutes, polypropylene having a MFR of 0.1 to 100 g/10 minutes, and an ethylene-vinyl acetate copolymer having a MFR of 0.1 to 200 g/10 minutes. The bonding sheet including at least one selected from the group described above has an appropriate flexibility, and is therefore hard to undergo material rupture after being bonded between the first member and the second member. Therefore, such a bonding sheet allows the first member and the second member to be bonded together in good condition.

The content of the vinyl acetate in the ethylene-vinyl acetate copolymer is preferably 3% to 40%, and more preferably 5% to 40%.

The polymer material of the binding sheet (such as the thermoplastic resin described above) may be or may not be crosslinked. Preferably, the polymer material of the bonding sheet is not crosslinked because the bonding sheet is easily melted upon irradiation of laser light.

The thickness of the bonding sheet is not particularly limited. If the thickness of the bonding sheet is too small, however, the first member and the second member may not be sufficiently bonded together with the bonding sheet interposed therebetween. Accordingly, the thickness of the bonding sheet is preferably 10 μm or more, and more preferably 20 μm or more. On the other hand, if the thickness of the bonding sheet is too large, one surface of the bonding sheet may not be sufficiently melted because laser light does not reach one surface (interface with the first member) of the bonding sheet. Accordingly, the thickness of the bonding sheet is preferably 500 μm or less, and more preferably 200 μm or less.

For melting the bonding sheet during irradiation of laser light, an absorbent that can absorb laser light is blended in the bonding sheet. The absorbent refers to an agent which, when added, can increase the laser absorptivity. Examples of the absorbent include inorganic pigments such as carbon black and oxide-based pigments; organic pigments such as phthalocyanine-based pigments, lake pigments, polycyclic pigments; dyes having an absorption wavelength appropriate for laser light used; and the like.

The blended amount of the absorbent is not particularly limited, but is normally 0.1% by mass to 3% by mass based on the total amount of the bonding sheet.

As described above, the melting point of the bonding sheet ($M_{sheet}$) is not particularly limited provided that the difference in melting point ($M_{foam}-M_{sheet}$) is in the range of $-50°$ C. to $20°$ C. However, the heat resistance is poor if the melting point ($M_{sheet}$) is too low, while the bonding sheet may not be sufficiently melted during laser bonding if the melting point ($M_{sheet}$) is too high.

From this point of view, the melting point of the bonding sheet ($M_{sheet}$) is preferably $60°$ C. to $170°$ C., more preferably $75°$ C. to $140°$ C., and particularly preferably $80°$ C. to $130°$ C.

The melt viscosity of the bonding sheet ($V_{sheet}$) is not particularly limited provided that the difference in melt viscosity ($V_{foam}-V_{sheet}$) is in the range of $3.0\times10^5$ Pa·s to $8.0\times10^5$ Pa·s. However, a sufficient bonding strength cannot be obtained if the melt viscosity ($V_{sheet}$) is too low, while a sufficient anchor effect for adherends (first member and second member) cannot be obtained if the melt viscosity ($V_{sheet}$) is too high.

From this point of view, if the difference in melt viscosity ($V_{foam}-V_{sheet}$) is in the range of $3.0\times10^5$ Pa·s to $8.0\times10^5$ Pa·s, the melt viscosity of the bonding sheet ($V_{sheet}$) is preferably 30 Pa·s to 50000 Pa·s, and more preferably 30 Pa·s to 35000 Pa·s.

As described above, if the difference in melt viscosity ($V_{foam}-V_{sheet}$) between the first member and the bonding sheet is more than $8.0\times10^5$ Pa·s, the bonding sheet having a melt viscosity ($V_{sheet}$) of 30 Pa·s to 2000 Pa·s is used.

That is, if the difference in melt viscosity ($V_{foam}-V_{sheet}$) is $8.0\times10^5$ Pa·s to $5.0\times10^6$ Pa·s, the bonding sheet having a melt viscosity ($V_{sheet}$) of 30 Pa·s to 2000 Pa·s is used.

The bonding sheet is obtained by molding a composition containing the polymer material and the absorbent into a sheet form. Examples of the molding method include known methods such as a melt extrusion method, a melt press method, a casting method, and the like.

The shape in plan view of the bonding sheet is preferably substantially the same as the shape in plan view of the first member.

An additive may be blended in the bonding sheet as required. For specific examples of the additive, see the passage of the first member described above as they are as described therein. If the additive is blended, the blended amount thereof is preferably 1% by mass to 20% by mass based on the total amount of the bonding sheet.

A bonding sheet having the abovementioned melting point ($M_{sheet}$) and melt viscosity ($V_{sheet}$) can be obtained by a known adjustment method. Examples of the adjustment method include selecting a polymer material and an additive as appropriate or having the polymer material non-crosslinked.

(Second Member)

The second member is not particularly limited as long as it has transparency to laser light. The laser light transmittance of the second member is preferably as high as possible. Specifically, the transmittance is not less than 10% or more, preferably 20% or more, and more preferably 30% or more.

Here, the transmittance is a transmittance when the second member has a thickness of 2 mm and is irradiated with laser light having a wavelength of 808 nm. The transmittance may be measured using, for example, a laser power meter (product name "NOVA II" manufactured by OPHIR Optronics Ltd.).

The second member may be formed of a foam like the first member, or may be formed of a non-foamed material. If the second member is formed of a non-foamed material, polymer materials shown below are preferably used. The second member formed of any of the polymer materials described below can be bonded in good condition to a bonding sheet melted by laser light. If the second member is formed of a foam, the second member is preferably a foam similar to the first member described above. If the second member is formed of a foam, it is preferable that for example, the difference between the melting point of the second member and the melting point of the bonding sheet (melting point of second member−melting point of bonding sheet) is $-50°$ C. to $20°$ C. and the difference between the melt viscosity of the second member and the melt viscosity of the bonding sheet (melt viscosity of second member−melt viscosity of bonding sheet) is $3.0\times10^5$ Pa·s to $8.0\times10^5$ Pa·s.

The material of the second member is not particularly limited as long as it is a polymer material that can be bonded to the bonding sheet. Examples of the polymer material include thermoplastic elastomers, rubbers, thermoplastic resins, and the like.

Examples of the thermoplastic elastomer include ethylene-vinyl acetate copolymer-based elastomers, olefin-based elastomers, styrene-based elastomers, urethane-based elastomers, ester-based elastomers, fluorine-based elastomers, silicone-based elastomers, polyamide-based elastomers, and the like. These may be used alone or in combination of two or more kinds.

Examples of the rubber include synthetic rubbers such as butadiene rubber (BR), isoprene rubber (IR), chloroprene (CR); natural rubbers (NR); copolymer rubbers such as styrene-butadiene rubber (SBR), styrene-butadiene-styrene rubber (SBSR), acrylonitrile-butadiene rubber (NBR), styrene-isoprene copolymer (SIR), butyl rubber (IIR); and the like. These may be used alone or in combination of two or more kinds.

Examples of the thermoplastic resin include olefin-based resins such as low density polyethylene, high density polyethylene, polypropylene, ethylene-vinyl acetate copolymers (EVA), and ethylene-α olefin copolymers; ester-based resins such as polyethylene terephthalate and polybutylene terephthalate; styrene-based resins such as polystyrene, AS resins and ABS resins; amide-based resins such as 6-nylon; vinyl chloride-based resins; acryl-based resins such as polymethylmethacrylate; vinyl acetate-based resins; and the like. These may be used alone or in combination of two or more kinds.

If the second member is an outersole of a shoe, the second member is preferably formed of a thermoplastic elastomer or a rubber, and more preferably formed of a non-foamed thermoplastic elastomer or a non-foamed rubber.

When the second member is formed of a rubber, the second member preferably contains silica in order to improve the transmittance of laser light. In other words, the second material formed of a rubber preferably contains a rubber and silica.

Silica is a filler for increasing the volume of the rubber and reinforcing the rubber.

For the silica, according to classification based on the method for production thereof, dry silica obtained by burning silicon tetrachloride in a oxyhydrogen flame, wet silica obtained by neutralizing an alkali silicate with an acid, sol-gel process silica obtained by hydrolyzing an alkoxide of silicon in an acidic or alkaline water-containing organic solvent, colloidal silica obtained by electrodialysis of an aqueous alkali silicate solution; and the like are known. In the present invention, these kinds of silica may be used alone or in combination of two or more kinds. Particularly, the dry silica is preferably used because it is hard to coagulate and has excellent dispersibility during processing.

The silica preferably has an average particle size of 5 nm to 120 nm. More preferably, the silica having an average particle size of 5 nm to 50 nm, the silica having an average particle size of more than 50 nm and 120 nm or less, or mixed silica of those two kinds of silica is used.

The content of the silica is set arbitrary. For example, if the silica having an average particle size of 5 nm to 50 nm is used alone, the content thereof is 10 parts by mass to 100 parts by mass based on 100 parts by mass of the rubber of the second member. If the content of the silica is less than 10 parts by mass, a sufficient reinforcing effect cannot be imparted to the second member, and thus the second member may have a poor mechanical strength. On the other hand, if the content of the silica is more than 100 parts by mass, the laser light transmittance of the second member may be less than 30%.

If the silica having an average particle size more than 50 nm and 120 nm or less is used alone, the content thereof is 10 parts by mass to 50 parts by mass based on 100 parts by mass of the rubber of the second member. If the content of the silica is less than 10 parts by mass, the rubber cannot be reinforced sufficiently, and therefore the second member having a poor mechanical strength may be obtained. On the other hand, if the content of the silica is more than 50 parts by mass, the laser light transmittance of the second member may be less than 30%.

The second member of the present invention may contain a filler other than the silica. Examples of the filler other than the silica include calcium carbonate, magnesium carbonate, magnesium oxide, titanium oxide, and the like.

The second member of the present invention preferably does not substantially contain an absorbent such as carbon black. The absorbent absorbs laser light as described above. Therefore, if the second member contains the absorbent, the laser light transmittance thereof excessively reduces.

The second member preferably contains a crosslinker. If the crosslinker is used, the rubber is crosslinked. Therefore, the second member having a good elasticity can be obtained.

The crosslinker is not particularly limited, and examples thereof include compounds containing sulfur, organic peroxides, and the like. Examples of the compounds containing sulfur include sulfur, halogenated sulfur, di-2-benzothiazolyl disulfide, N-oxidiethylene-2-benzothiazolyl sulfeneamide, and the like. Examples of the organic peroxides include dicumyl peroxide, 2,5-dimethyl-2,5-di(t-butylperoxy)hexane, 1,1-di(t-butylperoxy)cyclohexane, and the like.

The content of the crosslinker is preferably 0.5 to 10 parts by mass, and more preferably 0.5 to 5 parts by mass based on 100 parts by mass of the rubber.

The second member may contain various additives as exemplified above.

(Use of Laminate for Laser Bonding)

As shown in FIG. 1, a laminate for laser bonding 1 of the present invention has a first member 2 and a second member 4 laminated with a bonding sheet 3 interposed therebetween. The first member 2 and the second member 4 are bonded together with the bonding sheet 3 interposed therebetween by irradiation of laser light from the upper surface side of the second member 4 of the laminate 1.

The wavelength of laser light irradiated is 780 nm to 1000 nm. Generally, laser light having a wavelength of 808 nm is used. The irradiation rate of laser light is preferably 3 mm/sec to 15 mm/sec. The output of laser light is preferably total 100 W to 625 W with 4 to 25 diodes each of 10 W to 25 W.

Laser light passing through the second member is absorbed by the absorbent in the bonding sheet, whereby the bonding sheet generates heat. Consequently, the bonding sheet is melted and the first member is also melted by the heat.

The difference between the melting point of the first member (Mfoam) and the melting point of the bonding sheet (Msheet) (Mfoam−Msheet) is −50° C. to 20° C., and therefore the difference between the melt-solidification rate of the first member and the melt-solidification rate of the bonding sheet is small. Accordingly, the melted bonding sheet easily spreads over a large area of the surface of the first member. Furthermore, the difference between the melt viscosity of the first member (Vfoam) and the melt viscosity of the bonding sheet (Vsheet) (Vfoam−Vsheet) is in the certain range; therefore, the melted bonding sheet easily spreads over a large area of the surface of the first member and further, the melted bonding sheet easily enters recesses of the uneven surface of the first member formed of a foam. Accordingly, the bonding sheet is strongly bonded to the first member by the anchor effect.

In this way, in the laminate for laser bonding of the present invention, the bonding sheet and the first member are bonded together in good condition by irradiating laser light; therefore, the laminate is hard to be delaminated at the interface between the bonding sheet and the first member.

The melted bonding sheet is strongly bonded to the second member as well. Therefore, by irradiation of laser light, a laminate having the first member and the second member strongly bonded together with the bonding sheet interposed therebetween can be obtained.

The use of the laminate for laser bonding of the present invention is not particularly limited. The laminate for laser bonding can be formed into an appropriate flat shape or three-dimensional shape and thickness depending on its application.

In the laminate for laser bonding of the present invention, each of components is strongly bonded together by irradiation of laser light, and therefore the laminate can be suitably used as a component of a product that can be used under a severe environment. A preferable use of such a laminate for laser bonding is a component of a shoe.

Figure 2:
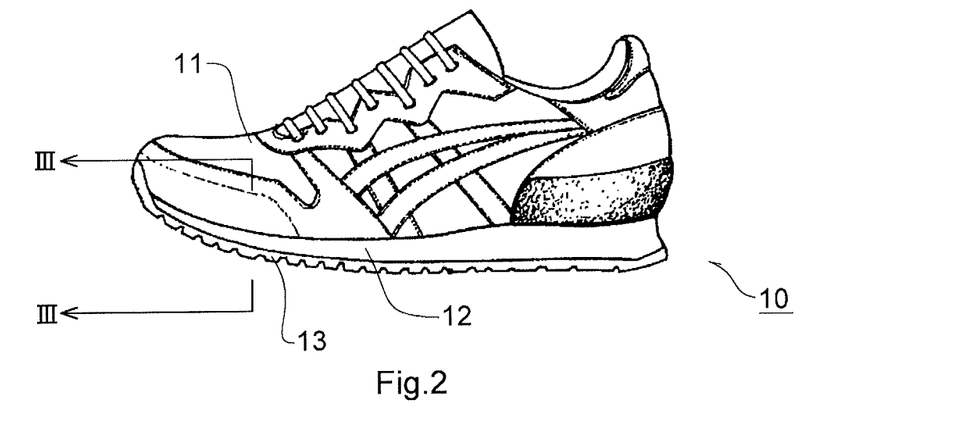
FIG. 2 is a side view of one embodiment of a shoe.
Figure 3:
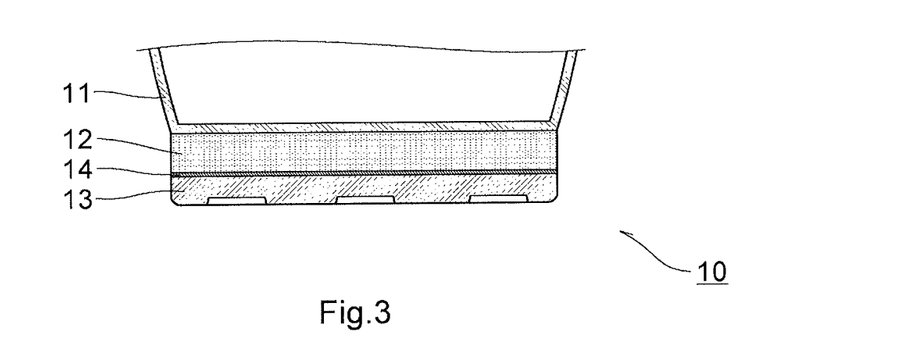
FIG. 3 is a cross-sectional view cut along line III-III of FIG. 2.

FIG. 2 and FIG. 3 show one embodiment of a shoe.

In FIG. 2 and FIG. 3, a shoe 10 is, for example, a sports shoe. The shoe 10 has a main body 11 covering an instep, a midsole 12 provided below the main body 11, and an outersole 13 provided below the midsole 12. Between the midsole 12 and the outersole 13, an adhesive layer 14 is provided. The midsole 12 and the outersole 13 are bonded with the adhesive layer 14 interposed therebetween.

In the shoes shown in FIGS. 2 and 3, the midsole 12 is formed with the first member, the outersole 13 is formed with the second member, and the adhesive layer 14 is formed with the bonding sheet.

EXAMPLE

The present invention will be further described in detail below with reference to Examples and Comparative Examples. Here, the present invention is not limited only to the following Examples.

[Materials Used for Examples and Comparative Examples]

(A) First Member (Foam)

Foam (1):

A foam consisting of a mixture of 100 parts by mass of low density polyethylene (product name "PETROSEN 170" manufactured by Tosoh Corporation; specific gravity 0.92; MFR 1.0 g/10 minutes), 2.5 parts by mass of a foaming agent (product name "AC#3C-K2" manufactured by EIWA CHEMICAL IND. CO., LTD.), 0.6 part by mass of a crosslinker (product name "PERCUMYL D" manufactured by NOF CORPORATION), 0.5 part by mass of a processing aid (stearic acid manufactured by New Japan Chemical Co., Ltd.), and 1 part by mass of zinc oxide (manufactured by Honjo Chemical Corporation).

The mixture was kneaded using a kneader, and then pressed at 160° C. at a pressure of 15 MPa for about 20 minutes using a pressing machine to thereby form the foam. The density of the foam was 0.11 g/cm$^3$. The foam had a thickness of 4 mm, a longitudinal length of 20 mm, and a lateral length of 50 mm.

Foam (2):

A foam consisting of a mixture of 100 parts by mass of an ethylene-α-olefin copolymer (product name "DF 110" manufactured by Mitsui Chemicals, Inc.; MFR 1.2 g/10 minutes), 3 parts by mass of a foaming agent (product name "AC#3C-K2" manufactured by EIWA CHEMICAL IND. CO., LTD.), 0.6 part by mass of a crosslinker (product name "PERCUMYL D" manufactured by NOF CORPORATION), 0.5 part by mass of a processing aid (stearic acid manufactured by New Japan Chemical Co., Ltd.), and 1 part by mass of zinc oxide (manufactured by Honjo Chemical Corporation).

The mixture was kneaded using a kneader, and then pressed at 160° C. at a pressure of 15 MPa for about 20 minutes using a pressing machine to thereby form the foam. The density of the foam was 0.12 g/cm$^3$. The foam had a thickness of 4 mm, a longitudinal length of 20 mm, and a lateral length of 50 mm.

Foam (3):

A foam consisting of a mixture of 100 parts by mass of an ethylene-vinyl acetate copolymer (product name "ULTRA-SEN 515" manufactured by Tosoh Corporation; vinyl acetate content 6%), 2.5 parts by mass of a foaming agent (product name "AC#3C-K2" manufactured by EIWA CHEMICAL IND. CO., LTD.), 0.6 part by mass of a crosslinker (product name "PERCUMYL D" manufactured by NOF CORPORATION), 0.5 part by mass of a processing aid (stearic acid manufactured by New Japan Chemical Co., Ltd.), and 1 part by mass of zinc oxide (manufactured by Honjo Chemical Corporation).

The mixture was kneaded using a kneader, and then pressed at 160° C. at a pressure of 15 MPa for about 20 minutes using a pressing machine to thereby form the foam. The density of the foam was 0.13 g/cm$^3$. The foam had a thickness of 4 mm, a longitudinal length of 20 mm, and a lateral length of 50 mm.

Foam (4):

A foam consisting of a mixture of 100 parts by mass of an ethylene-vinyl acetate copolymer (product name "ULTRA-SEN 631" manufactured by Tosoh Corporation; vinyl acetate content 20%), 1.75 parts by mass of a foaming agent (product name "AC#3C-K2" manufactured by EIWA CHEMICAL IND. CO., LTD.), 0.6 part by mass of a crosslinker (product name "PERCUMYL D" manufactured by NOF CORPORATION), 0.5 part by mass of a processing aid (stearic acid manufactured by New Japan Chemical Co., Ltd.), and 1 part by mass of zinc oxide (manufactured by Honjo Chemical Corporation).

The mixture was kneaded using a kneader, and then pressed at 160° C. at a pressure of 15 MPa for about 20 minutes using a pressing machine to thereby form the foam. The density of the foam was 0.18 g/cm$^3$. The foam had a thickness of 4 mm, a longitudinal length of 20 mm, and a lateral length of 50 mm.

Foam (5):

A foam consisting of a mixture of 100 parts by mass of low density polyethylene (product name "PETROSEN 170" manufactured by Tosoh Corporation; specific gravity 0.92; MFR 1.0 g/10 minutes), 3 parts by mass of a foaming agent (product name "AC#3C-K2" manufactured by EIWA CHEMICAL IND. CO., LTD.), 0.7 part by mass of a crosslinker (product name "PERCUMYL D" manufactured by NOF CORPORATION), 0.5 part by mass of a processing aid (stearic acid manufactured by New Japan Chemical Co., Ltd.), and 1 part by mass of zinc oxide (manufactured by Honjo Chemical Corporation).

The mixture was kneaded using a kneader, and then pressed at 160° C. at a pressure of 15 MPa for about 20 minutes using a pressing machine to thereby form the foam. The density of the foam was 0.12 g/cm$^3$. The foam had a thickness of 4 mm, a longitudinal length of 20 mm, and a lateral length of 50 mm.

Foam (6):

A foam consisting of a mixture of 100 parts by mass of an ethylene-α-olefin copolymer (product name "DF 110" manufactured by Mitsui Chemicals, Inc.; MFR 1.2 g/10 minutes), 4 parts by mass of a foaming agent (product name "AC#3C-K2" manufactured by EIWA CHEMICAL IND. CO., LTD.), 0.7 part by mass of a crosslinker (product name "PERCUMYL D" manufactured by NOF CORPORATION), 0.5 part by mass of a processing aid (stearic acid manufactured by New Japan Chemical Co., Ltd.), and 1 part by mass of zinc oxide (manufactured by Honjo Chemical Corporation).

The mixture was kneaded using a kneader, and then pressed at 160° C. at a pressure of 15 MPa for about 20 minutes using a pressing machine to thereby form the foam. The density of the foam was 0.12 g/cm$^3$. The foam had a thickness of 4 mm, a longitudinal length of 20 mm, and a lateral length of 50 mm.

Foam (7):

A foam consisting of a mixture of 100 parts by mass of low density polyethylene (product name "PETROSEN 170" manufactured by Tosoh Corporation; specific gravity 0.92; MFR 1.0 g/10 minutes), 3.5 parts by mass of a foaming agent (product name "AC#3C-K2" manufactured by EIWA CHEMICAL IND. CO., LTD.), 1 part by mass of a crosslinker (product name "PERCUMYL D" manufactured by NOF CORPORATION), 0.5 part by mass of a processing aid (stearic acid manufactured by New Japan Chemical Co., Ltd.), and 1 part by mass of zinc oxide (manufactured by Honjo Chemical Corporation).

The mixture was kneaded using a kneader, and then pressed at 160° C. at a pressure of 15 MPa for about 20 minutes using a pressing machine to thereby form the foam. The density of the foam was 0.11 g/cm$^3$. The foam had a thickness of 4 mm, a longitudinal length of 20 mm, and a lateral length of 50 mm.

Foam (8):

A foam consisting of a mixture of 100 parts by mass of an ethylene-αolefin copolymer (product name "DF 110" manufactured by Mitsui Chemicals, Inc.; MFR 1.2 g/10 minutes), 4 parts by mass of a foaming agent (product name "AC#3C-K2" manufactured by EIWA CHEMICAL IND. CO., LTD.), 1 part by mass of a crosslinker (product name "PERCUMYL D" manufactured by NOF CORPORATION), 0.5 part by mass of a processing aid (stearic acid manufactured by New Japan Chemical Co., Ltd.), and 1 part by mass of zinc oxide (manufactured by Honjo Chemical Corporation).

The mixture was kneaded using a kneader, and then pressed at 160° C. at a pressure of 15 MPa for about 20 minutes using a pressing machine to thereby form the foam. The density of the foam was 0.12 g/cm$^3$. The foam had a thickness of 4 mm, a longitudinal length of 20 mm, and a lateral length of 50 mm.

(B) Bonding Sheet

Sheet (1):

A sheet consisting of a mixture of 100 parts by mass of low density polyethylene (product name "PETROSEN 170" manufactured by Tosoh Corporation; specific gravity 0.92; MFR 1.0 g/10 minutes) and 0.1 part by mass of an infrared ray absorbing dye (product name "Lumogen IR 788" manufactured by BASF Japan Ltd.).

The mixture was kneaded with a twin-screw kneader, and then extruded into a sheet form at 200° C. to thereby form the sheet. The sheet had a thickness of 200 µm, a longitudinal length of 20 mm, and a lateral length of 50 mm.

Sheet (2):

A sheet consisting of a mixture of 100 parts by mass of low density polyethylene (product name "PETROSEN 349" manufactured by Tosoh Corporation; specific gravity 0.92; MFR 13 g/10 minutes) and 0.1 part by mass of an infrared ray absorbing dye (product name "Lumogen IR 788" manufactured by BASF Japan Ltd.).

The mixture was kneaded with a twin-screw kneader, and then extruded into a sheet form at 200° C. to thereby form the sheet. The sheet had a thickness of 200 µm, a longitudinal length of 20 mm, and a lateral length of 50 mm.

Sheet (3):

A sheet consisting of a mixture of 100 parts by mass of low density polyethylene (product name "PETROSEN 353" manufactured by Tosoh Corporation; specific gravity 0.92; MFR 145 g/10 minutes) and 0.1 part by mass of an infrared ray absorbing dye (product name "Lumogen IR 788" manufactured by BASF Japan Ltd.).

The mixture was kneaded with a twin-screw kneader, and then extruded into a sheet form at 200° C. to thereby form the sheet. The sheet had a thickness of 200 µm, a longitudinal length of 20 mm, and a lateral length of 50 mm.

Sheet (4):

A sheet consisting of a mixture of 100 parts by mass of high density polyethylene (product name "Nipolon Hard 6300" manufactured by Tosoh Corporation; specific gravity 0.96; MFR 0.25 g/10 minutes) and 0.1 part by mass of an infrared ray absorbing dye (product name "Lumogen IR 788" manufactured by BASF Japan Ltd.).

The mixture was kneaded with a twin-screw kneader, and then extruded into a sheet form at 200° C. to thereby form the sheet. The sheet had a thickness of 200 µm, a longitudinal length of 20 mm, and a lateral length of 50 mm.

Sheet (5):

A sheet consisting of a mixture of 100 parts by mass of high density polyethylene (product name "Nipolon Hard 5700" manufactured by Tosoh Corporation; specific gravity 0.95; MFR 1.0 g/10 minutes) and 0.1 part by mass of an infrared ray absorbing dye (product name "Lumogen IR 788" manufactured by BASF Japan Ltd.).

The mixture was kneaded with a twin-screw kneader, and then extruded into a sheet form at 200° C. to thereby form the sheet. The sheet had a thickness of 200 µm, a longitudinal length of 20 mm, and a lateral length of 50 mm.

Sheet (6):

A sheet consisting of a mixture of 100 parts by mass of high density polyethylene (product name "Nipolon Hard 1000" manufactured by Tosoh Corporation; specific gravity 0.96; MFR 20 g/10 minutes) and 0.1 part by mass of an infrared ray absorbing dye (product name "Lumogen IR 788" manufactured by BASF Japan Ltd.).

The mixture was kneaded with a twin-screw kneader, and then extruded into a sheet form at 200° C. to thereby form the sheet. The sheet had a thickness of 200 µm, a longitudinal length of 20 mm, and a lateral length of 50 mm.

Sheet (7):

A sheet consisting of a mixture of 100 parts by mass of polypropylene (product name "E-105GM" manufactured by Prime Polymer Co., Ltd.; specific gravity 0.9; MFR 0.5 g/10 minutes) and 0.1 part by mass of an infrared ray absorbing dye (product name "Lumogen IR 788" manufactured by BASF Japan Ltd.).

The mixture was kneaded with a twin-screw kneader, and then extruded into a sheet form at 200° C. to thereby form the sheet. The sheet had a thickness of 200 µm, a longitudinal length of 20 mm, and a lateral length of 50 mm.

Sheet (8):

A sheet consisting of a mixture of 100 parts by mass of polypropylene (product name "F113G" manufactured by Prime Polymer Co., Ltd.; specific gravity 0.91; MFR 3 g/10 minutes) and 0.1 part by mass of an infrared ray absorbing dye (product name "Lumogen IR 788" manufactured by BASF Japan Ltd.).

The mixture was kneaded with a twin-screw kneader, and then extruded into a sheet form at 200° C. to thereby form the sheet. The sheet had a thickness of 200 µm, a longitudinal length of 20 mm, and a lateral length of 50 mm.

Sheet (9):

A sheet consisting of a mixture of 100 parts by mass of polypropylene (product name "J-3000GP" manufactured by Prime Polymer Co., Ltd.; specific gravity 0.9; MFR 30 g/10 minutes) and 0.1 part by mass of an infrared ray absorbing dye (product name "Lumogen IR 788" manufactured by BASF Japan Ltd.).

The mixture was kneaded with a twin-screw kneader, and then extruded into a sheet form at 200° C. to thereby form the sheet. The sheet had a thickness of 200 µm, a longitudinal length of 20 mm, and a lateral length of 50 mm.

Sheet (10);

A sheet consisting of a mixture of 100 parts by mass of an ethylene-vinyl acetate copolymer (product name "ULTRASEN 515" manufactured by Tosoh Corporation; vinyl acetate content 6%) and 0.1 part by mass of an infrared ray absorbing dye (product name "Lumogen IR 788" manufactured by BASF Japan Ltd.).

The mixture was kneaded with a twin-screw kneader, and then extruded into a sheet form at 200° C. to thereby form the sheet. The sheet had a thickness of 200 μm, a longitudinal length of 20 mm, and a lateral length of 50 mm.

Sheet (11):

A sheet consisting of a mixture of 100 parts by mass of an ethylene-vinyl acetate copolymer (product name "ULTRASEN 530" manufactured by Tosoh Corporation; vinyl acetate content 6%) and 0.1 part by mass of an infrared ray absorbing dye (product name "Lumogen IR 788" manufactured by BASF Japan Ltd.).

The mixture was kneaded with a twin-screw kneader, and then extruded into a sheet form at 200° C. to thereby form the sheet. The sheet had a thickness of 200 μm, a longitudinal length of 20 mm, and a lateral length of 50 mm.

Sheet (12):

A sheet consisting of a mixture of 100 parts by mass of an ethylene-vinyl acetate copolymer (product name "ULTRASEN 631" manufactured by Tosoh Corporation; vinyl acetate content 20%) and 0.1 part by mass of an infrared ray absorbing dye (product name "Lumogen IR 788" manufactured by BASF Japan Ltd.).

The mixture was kneaded with a twin-screw kneader, and then extruded into a sheet form at 200° C. to thereby form the sheet. The sheet had a thickness of 200 μm, a longitudinal length of 20 mm, and a lateral length of 50 mm.

Sheet (13):

A sheet consisting of a mixture of 100 parts by mass of an ethylene-vinyl acetate copolymer (product name "ULTRASEN 633" manufactured by Tosoh Corporation; vinyl acetate content 20%) and 0.1 part by mass of an infrared ray absorbing dye (product name "Lumogen IR 788" manufactured by BASF Japan Ltd.).

The mixture was kneaded with a twin-screw kneader, and then extruded into a sheet form at 200° C. to thereby form the sheet. The sheet had a thickness of 200 μm, a longitudinal length of 20 mm, and a lateral length of 50 mm.

Sheet (14):

A sheet consisting of a mixture of 100 parts by mass of an ethylene-vinyl acetate copolymer (product name "ULTRASEN 680" manufactured by Tosoh Corporation; vinyl acetate content 20%) and 0.1 part by mass of an infrared ray absorbing dye (product name "Lumogen IR 788" manufactured by BASF Japan Ltd.).

The mixture was kneaded with a twin-screw kneader, and then extruded into a sheet form at 200° C. to thereby form the sheet. The sheet had a thickness of 200 μm, a longitudinal length of 20 mm, and a lateral length of 50 mm.

Sheet (15):

A sheet consisting of a mixture of 100 parts by mass of an ethylene-vinyl acetate copolymer (product name "ULTRASEN 750" manufactured by Tosoh Corporation; vinyl acetate content 35%) and 0.1 part by mass of an infrared ray absorbing dye (product name "Lumogen IR 788" manufactured by BASF Japan Ltd.).

The mixture was kneaded with a twin-screw kneader, and then extruded into a sheet form at 200° C. to thereby form the sheet. The sheet had a thickness of 200 μm, a longitudinal length of 20 mm, and a lateral length of 50 mm.

(C) Second Member

Elastomer Molded Product (1):

A molded product consisting of a mixture of 50 parts by mass of an ethylene-vinyl acetate copolymer (product name "ULTRASEN 650" manufactured by Tosoh Corporation) and 50 parts by mass of a styrene butadiene elastomer (product name "TR 2003" manufactured by JSR Corporation).

The mixture was kneaded using a twin-screw kneader to prepare pellets. The pellets were molded into a flat form using an injection molding machine (nozzle temperature 210° C.). The obtained elastomer molded product (second member) had a thickness of 2 mm, a longitudinal length of 20 mm, and a lateral length of 50 mm.

The melting points and melt viscosities of the foams (1) to (8) and sheets (1) to (15) were measured in accordance with the following methods. The results are shown in Table 1.

(Method for Measurement of Melting Point)

10 mg of each sample were taken, and the sample was heated from 25° C. to 250° C. at a rate of temperature rise of 10° C./min using a differential scanning calorimeter (product name "DSC 200 S3" manufactured by Netzsch Corporation) to thereby melt the sample. The peak top temperature of the DSC curve obtained by heating as described above was considered as a melting point.

(Method for Measurement of Melt Viscosity)

The melt viscosity of the sample was measured under the following conditions using a rheometer (product mane "Reosol-G3000" manufactured by UBM Co., Ltd.).

The complex viscosity obtained at a frequency of 1 Hz under a temperature of 200° C.±1° C. using a parallel plate (inter-gap distance: 2 mm; plate diameter: 18 mm) was considered as a melt viscosity.

TABLE 1

| Sample | Melting Point (° C.) | Melt Viscosity (Pa · s) |
|---|---|---|
| Foam (1) | 105.5 | 598467 |
| Foam (2) | 98.0 | 402397 |
| Foam (3) | 98.0 | 732096 |
| Foam (4) | 80.0 | 293447 |
| Foam (5) | 106.6 | 1975120 |
| Foam (6) | 99.7 | 5650880 |
| Foam (7) | 95.1 | 1038914 |
| Foam (8) | 105.6 | 2588525 |
| Sheet (1) | 109.1 | 13201 |
| Sheet (2) | 104.1 | 1472 |
| Sheet (3) | 102.6 | 36 |
| Sheet (4) | 130.6 | 30263 |
| Sheet (5) | 132.7 | 18662 |
| Sheet (6) | 129.6 | 697 |
| Sheet (7) | 163.3 | 27536 |
| Sheet (8) | 161.9 | 8062 |
| Sheet (9) | 166.6 | 721 |
| Sheet (10) | 100.3 | 5315 |
| Sheet (11) | 97.0 | 144 |
| Sheet (12) | 84.6 | 9553 |
| Sheet (13) | 81.7 | 628 |
| Sheet (14) | 78.9 | 69 |
| Sheet (15) | 64.2 | 531 |

Examples 1 to 23

A laminate of Example 1 was prepared by laminating the sheet (1) on the foam (1).

As shown in Table 2, laminates of Examples 2 to 23 were prepared in the same manner by laminating the forms and the sheets, respectively.

TABLE 2

| | First Member (Foam) | Bonding Sheet | Difference of Melting Point (° C.) | Difference of Melt Visocity (Pa · s) | Conditions after Delamination |
|---|---|---|---|---|---|
| Example 1 | Foam (1) | Sheet (1) | −3.6 | 585266 | material rupture |
| Example 2 | Foam (1) | Sheet (2) | 1.4 | 596995 | material rupture |
| Example 3 | Foam (1) | Sheet (3) | 2.9 | 598431 | material rupture |
| Example 4 | Foam (1) | Sheet (5) | −27.2 | 579806 | material rupture |
| Example 5 | Foam (1) | Sheet (6) | −24.1 | 597770 | material rupture |
| Example 6 | Foam (1) | Sheet (10) | 5.2 | 593152 | material rupture |
| Example 7 | Foam (2) | Sheet (3) | −4.6 | 402361 | material rupture |
| Example 8 | Foam (2) | Sheet (5) | −34.7 | 383735 | material rupture |
| Example 9 | Foam (2) | Sheet (6) | −31.6 | 401700 | material rupture |
| Example 10 | Foam (2) | Sheet (10) | −2.3 | 397082 | material rupture |
| Example 11 | Foam (2) | Sheet (11) | 1.0 | 402253 | material rupture |
| Example 12 | Foam (3) | Sheet (1) | −11.1 | 718895 | material rupture |
| Example 13 | Foam (3) | Sheet (2) | −6.1 | 730624 | material rupture |
| Example 14 | Foam (3) | Sheet (3) | −4.6 | 732060 | material rupture |
| Example 15 | Foam (3) | Sheet (5) | −34.7 | 713434 | material rupture |
| Example 16 | Foam (3) | Sheet (6) | −31.6 | 731399 | material rupture |
| Example 17 | Foam (3) | Sheet (10) | −2.3 | 726781 | material rupture |
| Example 18 | Foam (3) | Sheet (11) | 1.0 | 731952 | material rupture |
| Example 19 | Foam (3) | Sheet (12) | 13.4 | 722543 | material rupture |
| Example 20 | Foam (3) | Sheet (13) | 16.3 | 731468 | material rupture |
| Example 21 | Foam (3) | Sheet (14) | 19.1 | 732027 | material rupture |
| Example 22 | Foam (1) | Sheet (4) | −25.1 | 568205 | material rupture |
| Example 23 | Foam (2) | Sheet (4) | −32.6 | 372134 | material rupture |

Comparative Examples 1 to 41

A laminate of Comparative Example 1 was prepared by laminating the sheet (7) on the foam (1).

As shown in Tables 3 and 4, laminates of Comparative Examples 2 to 41 were prepared in the same manner by laminating the forms and the sheets, respectively.

The difference in melting point in each table is determined by the formula: melting point of foam−melting point of sheet. The difference in melt viscosity in each table is determined by the formula: melt viscosity of foam−melt viscosity of sheet.

TABLE 3

| | First Member (Foam) | Bonding Sheet | Difference of Melting Point (° C.) | Difference of Melt Visocity (Pa · s) | Conditions after Delamination |
|---|---|---|---|---|---|
| Comparative Example 1 | Foam (1) | Sheet (7) | −57.8 | 570931 | interfacial delamination |
| Comparative Example 2 | Foam (1) | Sheet (8) | −56.4 | 590405 | interfacial delamination |
| Comparative Example 3 | Foam (1) | Sheet (12) | 20.9 | 588914 | interfacial delamination |
| Comparative Example 4 | Foam (1) | Sheet (13) | 23.8 | 597839 | interfacial delamination |
| Comparative Example 5 | Foam (1) | Sheet (14) | 26.6 | 598398 | interfacial delamination |
| Comparative Example 6 | Foam (2) | Sheet (7) | −65.3 | 374861 | interfacial delamination |
| Comparative Example 7 | Foam (2) | Sheet (8) | −63.9 | 394335 | interfacial delamination |
| Comparative Example 8 | Foam (3) | Sheet (7) | −65.3 | 704560 | interfacial delamination |
| Comparative Example 9 | Foam (3) | Sheet (8) | −63.9 | 724034 | interfacial delamination |
| Comparative Example 10 | Foam (3) | Sheet (9) | −68.6 | 731375 | interfacial delamination |
| Comparative Example 11 | Foam (4) | Sheet (1) | −29.1 | 280246 | interfacial delamination |
| Comparative Example 12 | Foam (4) | Sheet (2) | −24.1 | 291975 | interfacial delamination |
| Comparative Example 13 | Foam (4) | Sheet (4) | −50.6 | 263184 | interfacial delamination |
| Comparative Example 14 | Foam (4) | Sheet (5) | −52.7 | 274785 | interfacial delamination |
| Comparative Example 15 | Foam (4) | Sheet (6) | −49.6 | 292750 | interfacial delamination |
| Comparative Example 16 | Foam (4) | Sheet (7) | −83.3 | 265911 | interfacial delamination |
| Comparative Example 17 | Foam (4) | Sheet (8) | −81.9 | 285385 | interfacial delamination |
| Comparative Example 18 | Foam (4) | Sheet (9) | −86.6 | 292726 | interfacial delamination |
| Comparative Example 19 | Foam (4) | Sheet (10) | −20.3 | 288132 | interfacial delamination |
| Comparative Example 20 | Foam (4) | Sheet (13) | −1.7 | 292819 | interfacial delamination |

TABLE 4

|  | First Member (Foam) | Bonding Sheet | Difference of Melting Point (° C.) | Difference of Melt Visocity (Pa · s) | Conditions after Delamination |
|---|---|---|---|---|---|
| Comparative Example 21 | Foam (4) | Sheet (14) | 1.1 | 293378 | interfacial delamination |
| Comparative Example 22 | Foam (5) | Sheet (1) | −2.5 | 1961919 | interfacial delamination |
| Comparative Example 23 | Foam (5) | Sheet (4) | −24.0 | 1944857 | interfacial delamination |
| Comparative Example 24 | Foam (5) | Sheet (7) | −56.7 | 1947584 | interfacial delamination |
| Comparative Example 25 | Foam (5) | Sheet (10) | 6.3 | 1969805 | interfacial delamination |
| Comparative Example 26 | Foam (5) | Sheet (12) | 22.0 | 1965567 | interfacial delamination |
| Comparative Example 27 | Foam (5) | Sheet (15) | 42.4 | 1974589 | interfacial delamination |
| Comparative Example 28 | Foam (6) | Sheet (1) | −9.4 | 5637679 | interfacial delamination |
| Comparative Example 29 | Foam (6) | Sheet (4) | −30.9 | 5620617 | interfacial delamination |
| Comparative Example 30 | Foam (6) | Sheet (7) | −63.6 | 5623344 | interfacial delamination |
| Comparative Example 31 | Foam (6) | Sheet (10) | −0.6 | 5645565 | interfacial delamination |
| Comparative Example 32 | Foam (6) | Sheet (12) | 15.1 | 5641327 | interfacial delamination |
| Comparative Example 33 | Foam (6) | Sheet (15) | 35.5 | 5650349 | interfacial delamination |
| Comparative Example 34 | Foam (7) | Sheet (7) | −68.2 | 1011377 | interfacial delamination |
| Comparative Example 35 | Foam (7) | Sheet (8) | −66.8 | 1030852 | interfacial delamination |
| Comparative Example 36 | Foam (8) | Sheet (7) | −57.7 | 2560989 | interfacial delamination |
| Comparative Example 37 | Foam (8) | Sheet (8) | −56.3 | 2580464 | interfacial delamination |
| Comparative Example 38 | Foam (8) | Sheet (9) | −61.0 | 2587805 | interfacial delamination |
| Comparative Example 39 | Foam (8) | Sheet (12) | 21.0 | 2578973 | interfacial delamination |
| Comparative Example 40 | Foam (8) | Sheet (13) | 23.9 | 2587898 | interfacial delamination |
| Comparative Example 41 | Foam (8) | Sheet (14) | 26.7 | 2588456 | interfacial delamination |

Under following circumstances, each of laminates of Examples 1 to 23 and Comparative Examples 1 to 41 was irradiated with laser light from the upper surface side of the bonding sheet.

Laser irradiation apparatus: manufactured by Emerson Japan, Ltd.

Wavelength of laser light: 808 nm.

Laser light irradiation rate: 4 mm/sec.

Laser light output: 300 W.

Laser light irradiation time: 2.5 seconds.

Each laminate after laser irradiation was subjected to a peel test using a tensile tester.

Specifically, for each laminate, the edge of the sheet and the edge of the foam were held by respective chucks of the tensile tester, and both the chucks were moved away from each other to thereby delaminate the sheet and the foam at a 180° angle (in other words, the edge of the sheet and the edge of the foam were drawn so as to break away in the direction of about 180° angle).

Conditions after delamination of the sheet and the foam were visually observed. The results are shown in Tables 2 to 4.

In the conditions after delamination in Tables 2 to 4, "material rupture" means that the sheet and the foam were not delaminated at the interface thereof and the foam itself was ruptured, and "interfacial delamination" means that the sheet and the foam were delaminated at the interface thereof.

Figure 4:
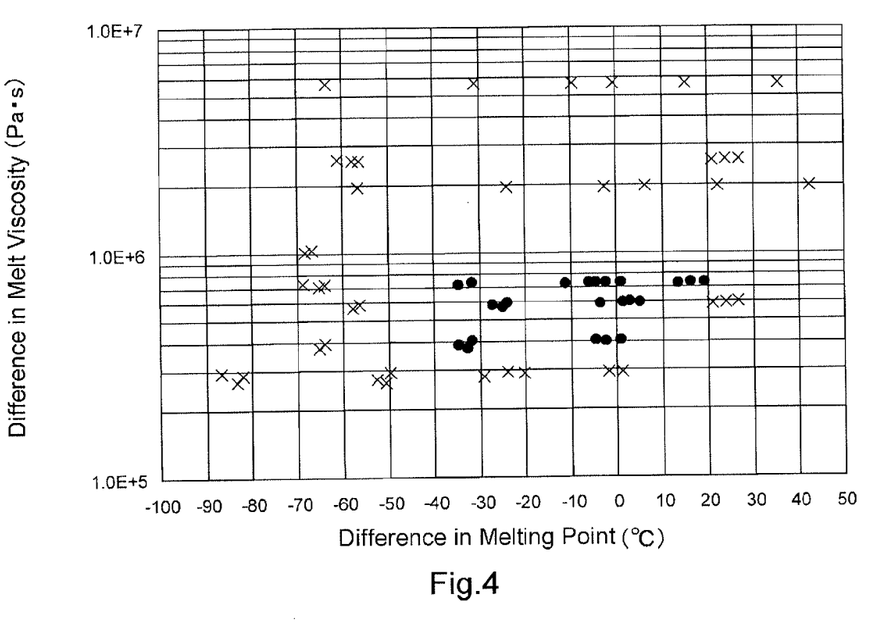
FIG. 4 is a graphical representation showing Examples 1 to 23 and Comparative Examples 1 to 41.

FIG. 4 is a graphical representation in which the difference in melting point between the foam and the sheet is plotted on the abscissa and the difference in melt viscosity is plotted on the ordinate for laminates of Examples 1 to 23 and Comparative Examples 1 to 41.

In FIG. 4, ● marks refer to Examples 1 to 23, while x marks refer to Comparative Examples 1 to 41.

From the results of Examples 1 to 23, the foam and the sheet were bonded together very strongly when the difference in melting point between the foam and the sheet (Mfoam−Msheet) was in the range of −50° C. to 20° C. and the difference in melt viscosity (Vfoam−Vsheet) was in the range of $3.0 \times 10^5$ Pa·s to $8.0 \times 10^5$ Pa·s.

From the results of Comparative Examples 1 to 41, the foam and the sheet underwent interfacial delamination and were not sufficiently bonded together when the difference in melting point between the foam and the sheet (Mfoam−Msheet) was out of the aforementioned range and/or the difference in melt viscosity between the foam and the sheet (Vfoam−Vsheet) was out of the aforementioned range. Referring to FIG. 4, differences in the difference in melting point and the difference in melt viscosity between Examples and Comparative Examples are evident.

Examples 24 to 31

As shown in Table 5, laminates of Examples 24 to 31 were prepared in the same manner by laminating the forms and the sheets, respectively.

TABLE 5

|  | First Member (Foam) | Bonding Sheet | Difference of Melting Point (° C.) | Difference of Melt Visocity (Pa · s) | Melt Viscosity of Bonding Sheet (Pa · s) | Conditions after Delamination |
|---|---|---|---|---|---|---|
| Example 24 | Foam (7) | Sheet (2) | −9.0 | 1037442 | 1472 | material rupture |
| Example 25 | Foam (7) | Sheet (3) | −7.5 | 1038877 | 36 | material rupture |
| Example 26 | Foam (7) | Sheet (6) | −34.5 | 1038217 | 697 | material rupture |
| Example 27 | Foam (7) | Sheet (11) | −1.9 | 1038769 | 144 | material rupture |
| Example 28 | Foam (8) | Sheet (2) | 1.5 | 2587054 | 1472 | material rupture |
| Example 29 | Foam (8) | Sheet (3) | 3.0 | 2588489 | 36 | material rupture |
| Example 30 | Foam (8) | Sheet (6) | −24.0 | 2587829 | 697 | material rupture |
| Example 31 | Foam (8) | Sheet (11) | 8.6 | 2588381 | 144 | material rupture |

Comparative Examples 42 to 50

As shown in Table 6, laminates of Comparative Examples 42 to 50 were prepared in the same manner by laminating the forms and the sheets, respectively.

TABLE 6

|  | First Member (Foam) | Bonding Sheet | Difference of Melting Point (° C.) | Difference of Melt Visocity (Pa · s) | Melt Viscosity of Bonding Sheet (Pa · s) | Conditions after Delamination |
|---|---|---|---|---|---|---|
| Comparative Example 42 | Foam (7) | Sheet (1) | −14.0 | 1025713 | 13201 | interfacial delamination |
| Comparative Example 43 | Foam (7) | Sheet (4) | −35.5 | 1008651 | 30263 | interfacial delamination |
| Comparative Example 44 | Foam (7) | Sheet (5) | −37.6 | 1020252 | 18662 | interfacial delamination |
| Comparative Example 45 | Foam (7) | Sheet (10) | −5.2 | 1033599 | 5315 | interfacial delamination |
| Comparative Example 46 | Foam (7) | Sheet (12) | 10.5 | 1029361 | 9553 | interfacial delamination |
| Comparative Example 47 | Foam (8) | Sheet (1) | −3.5 | 2575325 | 13201 | interfacial delamination |
| Comparative Example 48 | Foam (8) | Sheet (4) | −25.0 | 2558263 | 30263 | interfacial delamination |
| Comparative Example 49 | Foam (8) | Sheet (5) | −27.1 | 2569864 | 18662 | interfacial delamination |
| Comparative Example 50 | Foam (8) | Sheet (10) | 5.3 | 2583211 | 5315 | interfacial delamination |

For laminates of Examples 24 to 31 and Comparative Examples 42 to 50, the foam and the bonding sheet were bonded together by laser irradiation in the same manner as in Examples 1 to 23 and Comparative Examples 1 to 41.

For each of laminates of Examples 24 to 31 and Comparative Examples 42 to 50, a peel test was conducted in the same manner as in Examples 1 to 23 and Comparative Examples 1 to 41 after laser irradiation. The results are shown in Tables 5 and 6.

For Examples 24 to 31, the bonding sheet and the foam were not delaminated at the interface thereof in any case. For Comparative Examples 42 to 50, the bonding sheet and the foam were delaminated at the interface thereof in all cases.

From the results of Examples 24 to 31 and Comparative Examples 42 to 50, the following has been found.

When the difference in melting point between the foam and the sheet (Mfoam−Msheet) was in the range of −50° C. to 20° C. and the difference in melt viscosity (Vfoam−Vsheet) is in the range of $8.0 \times 10^5$ Pa·s to $5.0 \times 10^6$ Pa·s (especially when the difference in melt viscosity is in the range of $1.0 \times 10^6$ Pa·s to $3.0 \times 10^6$ Pa·s), the foam and the sheet can be bonded together very strongly if the melt viscosity of the sheet is 30 Pa·s to 2000 Pass.

Examples 32 to 37

As shown in Table 7, a laminate of Example 32 having a three-layer structure was prepared by placing the second member (elastomer molded product (1)) on the bonding sheet of the laminate prepared in Example 11 (laminate of the foam (2) and the sheet (11)).

As shown in Table 7, laminates of Examples 33 to 37 having a three-layer structure were each prepared by placing the second member in the same manner on the bonding sheet of each of laminates of Examples 18, 19, 20, 21 and 27.

TABLE 7

|  | First Member (Foam) | Bonding Sheet | Second Member | Conditions after Delamination |
|---|---|---|---|---|
| Example 32 | Foam (2) | Sheet (11) | Elastomer Molded Product (1) | material rupture |
| Example 33 | Foam (3) | Sheet (11) | Elastomer Molded Product (1) | material rupture |
| Example 34 | Foam (3) | Sheet (12) | Elastomer Molded Product (1) | material rupture |
| Example 35 | Foam (3) | Sheet (13) | Elastomer Molded Product (1) | material rupture |
| Example 36 | Foam (3) | Sheet (14) | Elastomer Molded Product (1) | material rupture |
| Example 37 | Foam (7) | Sheet (11) | Elastomer Molded Product (1) | material rupture |

Under following circumstances, each of laminates of Examples 32 to 37 was irradiated with laser light from the upper surface side of the second member.
Laser irradiation apparatus: manufactured by Emerson Japan, Ltd.
  Wavelength of laser light: 808 nm.
  Laser light irradiation rate: 4 mm/sec.
  Laser light output: 300 W.
  Laser light irradiation time: 2.5 seconds.

For each of the laminates of Examples 32 to 37 after laser irradiation, a peel test was conducted using a tensile tester in the same manner as in Examples 1.

Specifically, for each laminate, the edge of the second member and the edge of the foam were held by respective chucks of the tensile tester, and both the chucks were moved away from each other to thereby delaminate the second member and the foam at a 180° angle.

Conditions after delamination of the second member and the foam were visually observed. As a result, for the laminates of Examples 32 to 37, no delamination occurred at the interface between the second member and the sheet and at the interface between the sheet and the foam, and the foam itself was ruptured in any case.

It has been found from the results of Examples 32 to 37 that the second member and the foam can be strongly bonded together through the bonding sheet by irradiation of laser light.

INDUSTRIAL APPLICABILITY

The laminate for laser bonding of the present invention may be used for a component of a product having a foam such as a shoe, a sports product, and the like.

REFERENCE SIGNS LIST 1 laminate for laser bonding
2 first member
3 bonding sheet
4 second member
10 shoe
11 main body of shoe
12 midsole of shoe
13 outersole of shoe

What is claimed is:

1. A laminate for laser bonding, comprising:
a bonding sheet that is melted by irradiation of laser light; and
a first member laminated on one surface of the bonding sheet and formed of a thermoplastic foam having a plurality of recesses,
wherein:
a difference between a melting point of the first member and a melting point of the bonding sheet is between −50° C. and 20° C., the difference between the melting point of the first member and the melting point of the bonding sheet being a subtraction of the melting point of the bonding sheet from the melting point of the first member,
a difference between a melt viscosity of the first member and a melt viscosity of the bonding sheet is between $3.0 \times 10^5$ Pa·s and $8.0 \times 10^5$ Pa·s, the difference between the melt viscosity of the first member and the melt viscosity of the bonding sheet being a subtraction of the melt viscosity of the bonding sheet from the melt viscosity of the first member, and
the bonding sheet enters the plurality of recesses of the first member when the bonding sheet is melted by the irradiation of laser light.

2. A laminate, comprising:
a bonding sheet that is melted by irradiation of laser light; and
a first member laminated on one surface of the bonding sheet and formed of a thermoplastic foam having a plurality of recesses,
wherein:
a difference between a melting point of the first member and a melting point of the bonding sheet is between −50° C. and 20° C., the difference between the melting point of the first member and the melting point of the bonding sheet being a subtraction of the melting point of the bonding sheet from the melting point of the first member,
a difference between a melt viscosity of the first member and a melt viscosity of the bonding sheet is between $8.0 \times 10^5$ Pa·s and $5.0 \times 10^6$ Pa·s, the difference between the melt viscosity of the first member and the melt viscosity of the bonding sheet being a subtraction of the melt viscosity of the bonding sheet from the melt viscosity of the first member, and
the melt viscosity of the bonding sheet is between 30 Pa·s and 2000 Pa·s, and
the bonding sheet enters the plurality of recesses of the first member when the bonding sheet is melted by the irradiation of laser light.

3. The laminate according to claim 1, wherein the bonding sheet includes at least one of an olefin-based resin and an olefin-based elastomer, and the thermopastic foam includes at least one of the olefin-based resin and the olefin-based elastomer.

4. The laminate according to claim 1, wherein a second member having transparency to the laser light is laminated on a second surface of the bonding sheet.

5. A shoe comprising the laminate for laser bonding according to claim 1.

6. A method for producing a shoe, comprising the steps of:
preparing a laminate in which a first member formed of a thermoplastic foam, a bonding sheet that is melted by irradiation of laser light, and a second member having transparency to laser light are laminated in this order, with the difference between the melting point of the first member (Mfoam) and the melting point of the bonding sheet (Msheet) (Mfoam−Msheet) being −50° C. to 20° C. and the difference between the melt viscosity of the first member (Vfoam) and the melt viscosity of the bonding sheet (Vsheet) (Vfoam−Vsheet) being $3.0 \times 10^5$ Pa·s to $8.0 \times 10^5$ Pa·s; and
bonding the first member and the second member together with the bonding sheet interposed therebetween by irradiation of laser light from above the second member of the laminate.

7. A method for producing a shoe, comprising the steps of:
preparing a laminate in which a first member formed of a thermoplastic foam, a bonding sheet that is melted by irradiation of laser light, and a second member having transparency to laser light are laminated in this order, with the difference between the melting point of the first member (Mfoam) and the melting point of the bonding sheet (Msheet) (Mfoam−Msheet) being −50° C. to 20° C. and the difference between the melt viscosity of the first member (Vfoam) and the melt viscosity of the bonding sheet (Vsheet) (Vfoam−Vsheet) being $8.0 \times 10^5$ Pa·s to $5.0 \times 10^6$ Pa·s, and the melt viscosity of the bonding sheet (Vsheet) is 30 Pa·s to 2000 Pa·s; and
bonding the first member and the second member together with the bonding sheet interposed therebetween by irradiation of laser light from above the second member of the laminate.

8. The laminate according to claim 2, wherein:
the bonding sheet includes at least one of an olefin-based resin and an olefin-based elastomer, and
the thermoplastic foam includes at least one of the olefin-based resin and the olefin-based elastomer.

9. The laminate according to claim 2, wherein a second member having transparency to the laser light is laminated on another surface of the bonding sheet.

10. A shoe comprising the laminate for laser bonding according to claim 2.

11. The laminate of claim 4, wherein:
the first member is a midsole of a shoe;
the second member is an outersole of the shoe; and
the bonding sheet includes an adhesive enclosed by most of the midsole and most of the outersole.

12. The laminate of claim 1, wherein:
the entering of the plurality of recesses by the melted bonding sheet strengthens a bonding between the first member and the bonding sheet.

* * * * *